H. McKEE.
AUTOMATIC SAFETY APPLIANCE FOR AUTOMOBILES.
APPLICATION FILED OCT. 18, 1915.
1,182,395.
Patented May 9, 1916.
2 SHEETS—SHEET 1.
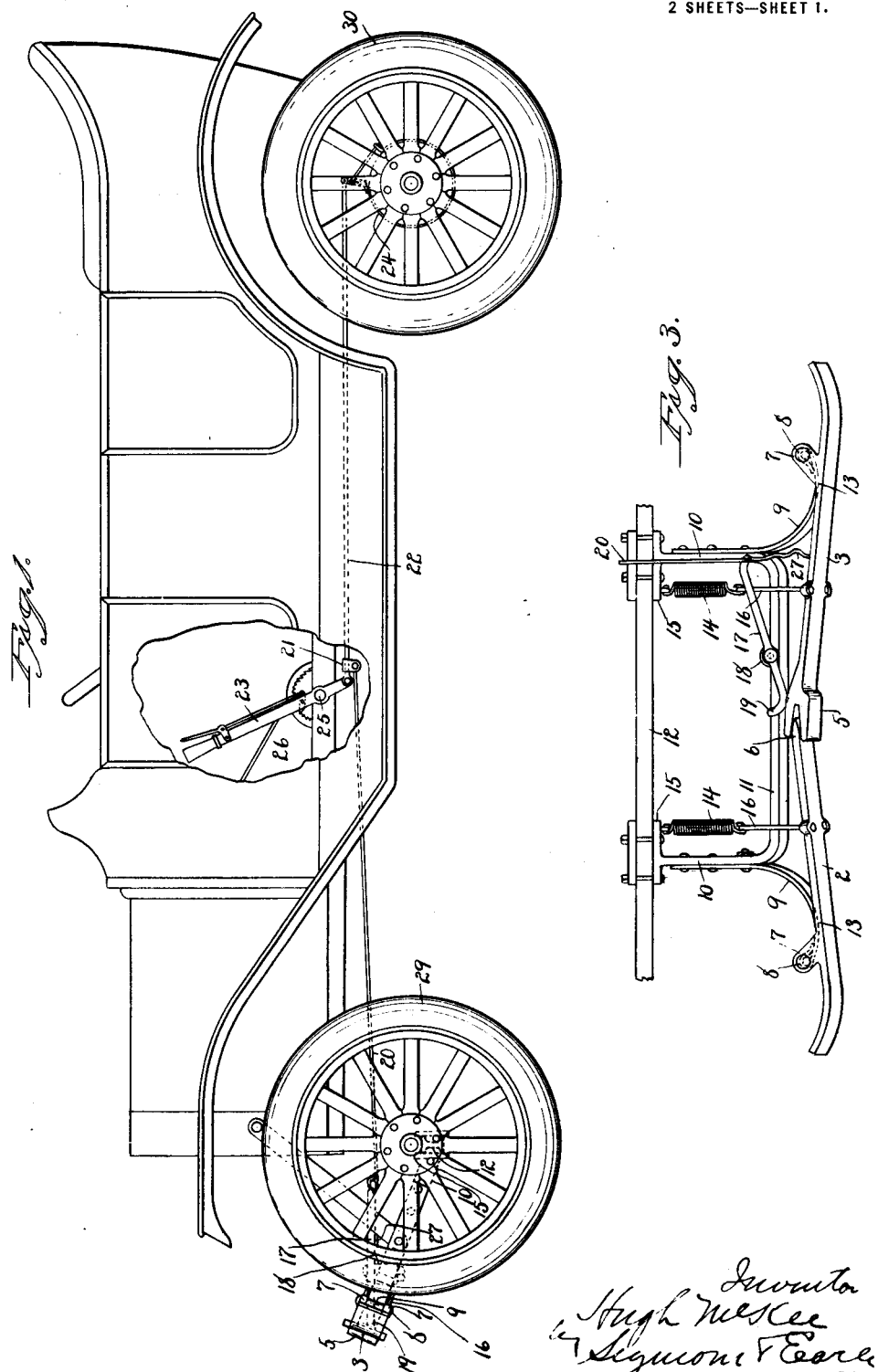

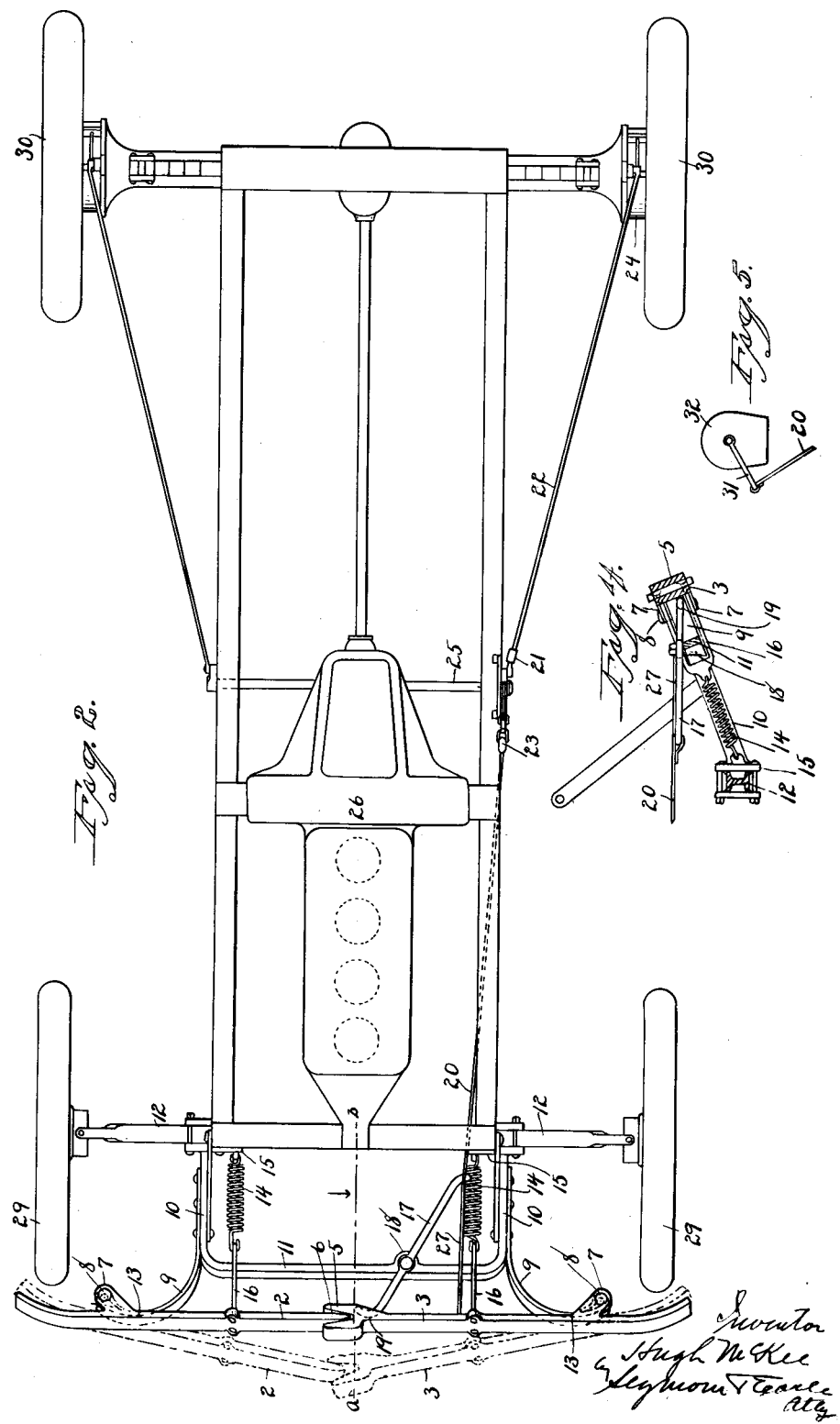

UNITED STATES PATENT OFFICE.

HUGH McKEE, OF DANIELSON, CONNECTICUT.

AUTOMATIC SAFETY APPLIANCE FOR AUTOMOBILES.

1,182,395. Specification of Letters Patent. Patented May 9, 1916.

Application filed October 18, 1915. Serial No. 56,525.

*To all whom it may concern:*

Be it known that I, HUGH MCKEE, a citizen of the United States, residing at Danielson, in the county of Windham and State of Connecticut, have invented a new and useful Improvement in Automatic Safety Appliances for Automobiles; and I do hereby declare the following, when taken in connection with the accompanying drawings and the characters of reference marked thereon, to be a full, clear, and exact description of the same, and which said drawings constitute part of this application, and represent, in—

Figure 1 a view in side elevation of an automobile provided with my improved automatic safety appliance. Fig. 2 a plan view of the chassis of the automobile. Fig. 3 a broken plan view of the safety appliance in one of its operating positions. Fig. 4 a view of the device in horizontal section on the line *a—b* of Fig. 2. Fig. 5 a detail view illustrating the connection of the safety appliance with an electric cut-out.

My invention relates to an improvement in automatic safety appliances of the fender type for automobiles, whereby in case of collision, the power is shut off and the brakes applied for the stopping of the car, the object being to provide a simple and reliable appliance for the purpose indicated.

With these ends in view, my invention consists in an automatic safety appliance for automobiles having certain details of construction as will be hereinafter described and pointed out in the claims.

In carrying out my invention as herein shown, I employ two pivotal fenders 2 and 3 substantially corresponding to each other in length, and normally located in line with each other forward of the front of the car and at a right angle to the longitudinal axis thereof, their outer ends being curved rearwardly to occupy positions of close proximity to the front wheels 29 of the car. The inner end of the fender 3 is formed with a yoke 5 receiving a tongue 6 formed upon the inner end of the fender 2, whereby the two fenders are flexibly joined together, so that the movement of either fender correspondingly moves the other. Each of the said fenders is provided at a point toward its outer end with a pair of rearwardly projecting perforated lugs 7 carrying a pin 8, whereby the fenders are adapted to be pivotally mounted, respectively, upon the outer ends of two outwardly bowed leaf springs 9, the outer ends of which are wrapped around the said pins 8. The inner ends of the said springs, which extend in opposite directions, are bolted to the parallel side arms 10 of a U-shaped fender-frame 11 secured to the front axle 12 of the car. Under this construction, the fenders 2 and 3 are yieldingly supported by the outwardly bowed leaf-springs 9 upon which they bear at the points 13 thereon. Supplemental helical springs 14 connected at their rear ends with base-plates 15 of the fender-frame 11, are connected at their forward ends to the respective fenders 2 and 3 by means of yokes 16 straddling the frame 11. The said supplemental springs 14 hold the fenders against the said points 13 on the leaf-springs 9, thus normally maintaining the fenders in line with each other as shown in Fig. 2. An operating-lever 17 pivotally mounted upon a lug 18 on the frame 11, is bent at its outer end to form a finger 19 which engages with the inner member of the yoke 5 of the fender 3, the inner end of the said lever 17 being connected, as shown, by a chain or cable 20 with a clip 21 mounted upon the forward end of a brake-operating rod 22 pivotally connected with the lower end of the handle 23 of an emergency brake of any approved type. The said rod 22 is at its rear end connected in the usual manner with band-brakes 24 which need no particular description. The handle 23 is mounted in the usual manner upon the emergency-shaft 25 which runs to the engine 26 and controls the clutch (not shown) thereof. The lever 17 is also connected by a cable 27 with the fender 3, though this is not essential.

In the ordinary use of an automobile, the fenders 2 and 3 will be held in line with each other at a right angle to the longitudinal axis of the car, as shown in Fig. 2. Now in case either fender is brought into collision upon the outer face of its curved outer end, the central portions of both fenders will be deflected forwardly into the positions shown by broken lines in Fig. 2, against the tension of the supplemental springs 14. When the springs 14 have been stretched to the limit permitted by the yokes 16 which are brought to a stop upon the fender-frame 11, the heavy leaf-springs 9 will bend and further increase the angle of the forward deflection of the fenders 2 and 3. During this last movement of the fenders, their outer ends will be brought into contact with the tires 28 of the front wheels 29 of the car. The described forward movement of the fender 3 will also pull the cable 20 forward, throwing the emergency-brake handle 23 rearward in the same manner as though it were operated by hand, whereby the clutch (not shown) connected with the emergency-shaft 25 will be operated. As the brake-handle 23 is swung rearward, as described, it operates through the rod 22 to apply the brakes 24 to the rear wheels 30. On the other hand, in case the fenders 2 and 3 should, as the result of a collision, be struck centrally or at any point between the pivots 8, they will be forced rearwardly, as shown in Fig. 3, whereby the lever 17 will be swung on its pivot with the effect of drawing the cable 20 forward, and in this manner automatically operating the emergency-brake 23 with the results before stated, of cutting off the power of the engine and of applying the brakes 24 to the rear wheels 30. If the character of the object collided with is large enough to take in, as it were, both fenders without deflecting them either inwardly or outwardly, they will be forced directly rearwardly without deflection by the yielding of the leaf-springs 9, whereby the lever 17 will be operated as before to automatically function the emergency-brake 23, and hence to cut off the power of the engine and apply the brakes to the rear wheels of the car.

It will be understood that my present invention is concerned with the character of the fenders, and other features of the safety appliance, and not with the character of the parts which the appliance operates. Thus, the cable 20 instead of being used to disengage the engine clutch, may be used to operate the handle 31 of an electric switch 32 controlling the cut-off to the ignition current of the motor, as shown in Fig. 5, with the result well understood of shutting down the engine and stopping the car.

I claim:—

1. In an automatic safety appliance for automobiles, the combination with two fenders located forward of the front wheels of a car and having their inner ends flexibly connected so that the movement of either moves the other, of two springs upon which the said fenders are respectively mounted, and a lever co-acting with one of the said fenders and adapted to be connected with the driving and brake mechanisms of the car.

2. In an automatic safety appliance for automobiles, the combination with two fenders located forward of the front wheels of a car and having their inner ends flexibly connected, of two bowed leaf-springs upon which the said fenders are respectively mounted, and means operated by one of the said fenders and controlling the driving and brake mechanisms of the car.

3. In an automatic safety appliance for automobiles, the combination with two fenders having flexible connection at their inner ends so that the movement of either moves the other, of two springs upon which the respective fenders are mounted, and a lever co-acting with one of the said fenders and adapted to be connected with the driving and brake-mechanisms of the car to which the appliance is applied.

4. In an automatic safety appliance for automobiles, the combination with two fenders located at the front end of a car in a line at a right angle to the longitudinal axis thereof, and having tongue and fork connection at their inner ends, of two springs with which the said fenders are connected respectively, and means co-acting with one of the said fenders and operated thereby for controlling the driving mechanism of the car to which the appliance is attached.

5. In an automatic safety appliance for automobiles, the combination with two fenders located forward of the front wheels of a car and having their inner ends flexibly connected and their outer ends shaped and positioned for co-action with the said wheels, two springs upon which the respective fenders are pivotally mounted, and means co-acting with one of the said fenders for controlling the driving and brake-mechanisms of the car.

6. In an automatic safety appliance for automobiles, the combination with two fenders located in front of the front wheels of a car and having their inner ends flexibly connected together, of two bowed springs upon which the said fenders are respectively mounted, supplemental springs connected with the fenders for normally holding them in place and supplementing the action of the said bowed springs, and means co-acting with one of the said fenders and controlling the driving and brake-mechanisms of the car.

7. In an automatic safety appliance for automobiles, the combination with two fenders located in front of the front wheels of a car and having their inner ends flexibly connected, of two bowed springs upon which the fenders are respectively mounted, means co-acting with one of the fenders for operation thereby when the inner ends of the same are deflected inwardly, connection between the said means and the driving and brake-mechanisms of the car, and connection between the driving and brake-mechanisms of the car and one of the fenders for the operation of the said driving and brake-mechanisms when the fenders have their inner ends deflected outwardly.

8. In an automatic safety appliance for automobiles, the combination with two fenders located forward of the front wheels of a car and having their inner ends flexibly connected, of two bowed springs upon which the fenders are respectively mounted, a fender-support extending forward of the car and having the said springs attached to it, supplemental springs connected with the fenders and co-acting with the said fender-support, and means operated by one of the fenders and connected with the driving and brake-mechanisms of the car.

HUGH McKEE.